United States Patent
Lee

(10) Patent No.: US 7,274,682 B2
(45) Date of Patent: Sep. 25, 2007

(54) APPARATUS AND METHOD FOR ASSIGNING A SUPPLEMENTAL CHANNEL IN MOBILE COMMUNICATION SYSTEM

(75) Inventor: Sung-Won Lee, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 512 days.

(21) Appl. No.: 09/761,005

(22) Filed: Jan. 16, 2001

(65) Prior Publication Data

US 2001/0016496 A1    Aug. 23, 2001

(30) Foreign Application Priority Data

Jan. 15, 2000    (KR) ................. 2000-1893

(51) Int. Cl.
*H04Q 7/20*    (2006.01)
*H04B 7/216*    (2006.01)

(52) U.S. Cl. ............... 370/348; 370/443; 455/450

(58) Field of Classification Search ........ 370/335, 370/348, 443, 441, 329, 337, 342, 345, 347, 370/437

See application file for complete search history.

(56) References Cited

U.S. PATENT DOCUMENTS 4,612,637 A * 9/1986 Davis et al. ............. 370/348

5,883,888 A * 3/1999 St-Pierre .................. 370/331

(Continued)

OTHER PUBLICATIONS

European Search Report dated Dec. 16, 2003 issued in a counterpart application, namely, Appln. No. 01901596.5.

(Continued)

*Primary Examiner*—Seema S. Rao
*Assistant Examiner*—Robert C Scheibel
(74) *Attorney, Agent, or Firm*—The Farrell Law Firm

(57) ABSTRACT

There is provided a supplemental channel assigning apparatus and method in a mobile communication system. In the supplemental channel assigning method, a mobile station receives a plurality of supplemental channel assignment messages successively from a base station on an existing traffic channel, each of the channel assignment messages having the fields of a start time, a duration, a sequence number for message identification, and a channel identifier for channel identification, and stores the received channel assignment messages in a memory according to the durations and sequence numbers of the channel assignment messages. The mobile station then conducts data communication on a channel corresponding to the channel identifier of a first read channel assignment message for a period between the start time and the end of the duration set in the read channel assignment message and then on a channel corresponding to the channel identifier of a next read channel assignment message for a period between the start time and the end of the duration set in the next channel assignment message, the start time of the next channel assignment message being set to or after the end of the data communication according to the first read channel assignment message.

35 Claims, 12 Drawing Sheets

U.S. PATENT DOCUMENTS

| | | | |
|---|---|---|---|
| 6,011,806 A * | 1/2000 | Herring | 370/494 |
| 6,097,717 A | 8/2000 | Turina et al. | |
| 6,167,248 A * | 12/2000 | Hamalainen et al. | 455/403 |
| 6,438,119 B1 * | 8/2002 | Kim et al. | 370/335 |
| 6,469,993 B1 * | 10/2002 | Seo et al. | 370/329 |
| 6,473,419 B1 * | 10/2002 | Gray et al. | 370/349 |
| 6,504,832 B1 * | 1/2003 | Koo et al. | 370/342 |
| 6,618,375 B2 * | 9/2003 | Rezaiifar et al. | 370/394 |
| 6,636,496 B1 * | 10/2003 | Cho et al. | 370/335 |
| 2003/0210674 A1 * | 11/2003 | Honkasalo et al. | 370/338 |

OTHER PUBLICATIONS

3GPP2 Specifications.

3rd Generation Partnership Project 2 "3GPP2", C.S0005-0 Version 1.0, Jul. 1999.

Russian Office Action with cited reference (WO96/31077).

Japanese Office Action dated Nov. 4, 2003 issued in a counterpart application, namely, Appln. No. 2001-552554.

3rd Generation Partnership Project 2, "Upper Layer (Layer 3) Signaling Standard For CDMA2000 Spread Spectrum Systems," Jun. 9, 1999, pp. 1140-1149.

* cited by examiner

FIG. 7

| RECORD#1 | START-TIME | DURATION | SEQ(OR MSG ID) | CODE/SLOT/CHANNEL ID | GENERAL INFORMATION |
|---|---|---|---|---|---|
| RECORD#2 | START-TIME | DURATION | SEQ(OR MSG ID) | CODE/SLOT/CHANNEL ID | GENERAL INFORMATION |
| ... | ... | | | | ... |
| RECORD#n | START-TIME | DURATION | SEQ(OR MSG ID) | CODE/SLOT/CHANNEL ID | GENERAL INFORMATION |

APPARATUS AND METHOD FOR ASSIGNING A SUPPLEMENTAL CHANNEL IN MOBILE COMMUNICATION SYSTEM

PRIORITY

This application claims priority to an application entitled "Apparatus and Method for Assigning Supplemental Channel in Mobile Communication System" filed in the Korean Industrial Property Office on Jan. 15, 2000 and assigned Serial No. 2000-1893, the contents of which are hereby incorporated by reference.

BACKGROUND OF THE INVENTION

1. Field of the Invention

The present invention relates generally to a data communication apparatus and method in a mobile communication system, and in particular, to an apparatus and method for assigning a supplemental channel (SCH) to service data communication in a high-speed radio communication network.

2. Description of the Related Art

Cellular systems have been developed to provide diverse high-speed data services as well as voice service in the mobile communication industry. As a main example, the future mobile communication systems will provide an improved method of efficiently assigning high-speed radio traffic channels to service information over high-speed radio communication networks such as IMT2000, cdma2000, W-CDMA, UMTS, GPRS, and GSM. The configuration of a typical mobile communication network related to channel assignment technology is shown in FIG. 1.

Referring to FIG. 1, the mobile communication network generally includes a BSS (Base Station System) 110 and an MS (Mobile Station) 120. The BSS 110 has a radio resources management processor 112 and the MS 120, a radio resources management processor 122. The radio resources management processors 112 and 122 are usually called L3/LAC RRM/RM, where L3 refers to layer 3, LAC refers to link access control, RRM refers to radio resource management and RM refers to resource management. The radio resources management processor 112 supports the function of assigning and releasing a high-rate radio traffic channel and provides radio resources-related control.

A high-rate radio traffic channel can transmit data on a kbps to Mbps level and the number of radio traffic channels is limited within a given frequency band for radio communication.

FIG. 2 is a flowchart illustrating a conventional radio traffic channel assigning procedure. Referring to FIG. 2, upon receipt of a supplemental channel assignment message (SCAM) from a BSS in step 210, an MS determines whether the SCAM satisfies conditions A and B in steps 212 and 222. Condition A is considered in two parts: one is that there is a radio traffic channel assigned by a previous SCAM and having a duration time that has not expired; and the other is that the channel identifier (ID) of the existing radio traffic channel is identical to that of a newly assigned radio traffic channel. Condition B is that traffic is being transmitted on the existing radio traffic channel.

If condition A is not satisfied in step 212, the MS waits until a start time set in the received SCH in step 214. Condition A is not satisfied in the case where the radio traffic channel assigned by the previous SCAM and having a duration time that has not expired does not exist, or in the case where the channel IDs of the newly assigned radio traffic channel and the existing radio traffic channel are different. If the start time comes in step 216, traffic is transmitted between the MS and the BSS on the radio traffic channel assigned by the received SCAM in step 218. If the start time does not come in step 216, the process returns to step 214 to wait for the start time. If the duration time of the assigned radio traffic channel expires, the MS releases the radio traffic channel in step 220.

On the other hand, if condition A is satisfied, the MS determines whether condition B is satisfied in step 222. If condition B is satisfied, the received SCAM is in effect after the existing radio traffic channel is released. That is, when traffic transmission on the existing radio traffic channel is completed, the MS waits until the start time set in the received SCAM and transmits/receives traffic for the duration time of the new radio traffic channel. This operation is executed in step 224 and this radio traffic channel assignment is shown in FIG. 3. As shown in FIG. 3, if the start time set in the present SCAM is after the end of the duration time set in the previous SCAM, the MS can service data transmission related with the SCAMs. Following execution of step 224, the process returns to step 214.

If condition B is not satisfied in step 222, the MS discards the previous SCAM in step 226, returns to step 214, waits until the start time set in the present SCAM in step 216, and then transmits traffic on for the duration time in step 218. This radio traffic channel assignment is shown in FIG. 4. As shown in FIG. 4, if the present SCAM has arrived before the start time set in the previous SCAM, the MS neglects the previous SCAM and services data transmission related with the present SCAM. In this case, although the start time set in the present SCAM is after the end of the duration time set in the previous SCAM, the previous SCAM becomes void and thus its related data transmission is not performed.

The above conventional radio traffic channel assigning method has problems caused by circuit type channel assignment. In FIG. 4, one SCAM is stored in one time period. Although two SCAMs with different start times are received in a T0-T1 time period, the earlier SCAM is neglected and only the later SCAM is stored. In this respect, the conventional channel assigning methods cannot follow the developmental trend that the BSS gets more intelligent and the efficiency of radio traffic channels is increased along with the data-oriented development of the radio communication network. Returning to FIG. 4, although the BSS additionally assigns a T3-T4 period to the MS based on an estimate of the future radio situation after it assigns a T1-T3 period to the MS, the earlier assignment is neglected if the two SCAMs arrive before the start time set in the first SCAM. As a result, only the T3-T4 period is available to the MS, thereby dissipating radio resources.

Besides, if a SCAM requesting assignment of the same SCH arrives after data communication is completed on the SCH assigned by a previous SCAM, the existing SCH is still maintained. This is another cause of the radio resources dissipation.

SUMMARY OF THE INVENTION

An object of the present invention is, therefore, to provide an SCH assigning apparatus and method for appropriately allocating transmission periods by estimating the future radio environment.

Another object of the present invention is to provide an SCH assigning apparatus and method for efficiently managing SCHs.

A further object of the present invention is to provide an SCH assigning apparatus and method for processing a plurality of SCAMs.

Still another object of the present invention is to provide an SCH assigning apparatus and method with an improved SCH scheduling function.

Yet another object of the present invention is to provide an SCH assigning apparatus and method for fully using an SCH in order to increase the efficiency of limited radio resources.

A still further object of the present invention is to provide an SCH assigning apparatus and method for processing all received SCAMs using a scheduling table.

These and other objects can be achieved by providing a supplemental channel assigning apparatus and method in a mobile communication system. In the supplemental channel assigning method, a mobile station receives a plurality of supplemental channel assignment messages successively from a base station on an existing traffic channel, each of the channel assignment messages having the fields of a start time, a duration, a sequence number for message identification, and a channel identifier for channel identification, and the mobile station stores the received channel assignment messages in a memory according to the durations and sequence numbers of the channel assignment messages. The mobile station then conducts data communication on a channel corresponding to the channel identifier of a first read channel assignment message for a period between the start time and the end of the duration set in the read channel assignment message and then on a channel corresponding to the channel identifier of a next read channel assignment message for a period between the start time and the end of the duration set in the next channel assignment message, the start time of the next channel assignment message being set to or after the end of the data communication according to the first read channel assignment message.

BRIEF DESCRIPTION OF THE DRAWINGS

The above and other objects, features and advantages of the present invention will become more apparent from the following detailed description when taken in conjunction with the accompanying drawings in which:

FIG. 7 illustrates an embodiment of a scheduling table for SCH assignment in a CDMA MS according to the present invention;

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

While the following description will be conducted in the context of a cdma2000 system for better understanding of the present invention, it is obvious that the present invention is not limited to cdma2000 but applicable to other radio communication networks. Channels are assigned and released based on CDMA but this can also be implemented in a TDMA radio communication network such as GSM by conceptually mapping channels to slots.

In cdma2000, radio traffic channels include an SCH, an FCH (Fundamental Channel), a DCCH (Dedicated Control Channel), and an SCCH (Supplemental Code Channel). The SCH is mainly used for high-rate transmission on a Kbps-Mbps level. Therefore, it is to be appreciated that the SCH used hereinbelow is representative of the radio traffic channels.

Figure 5:
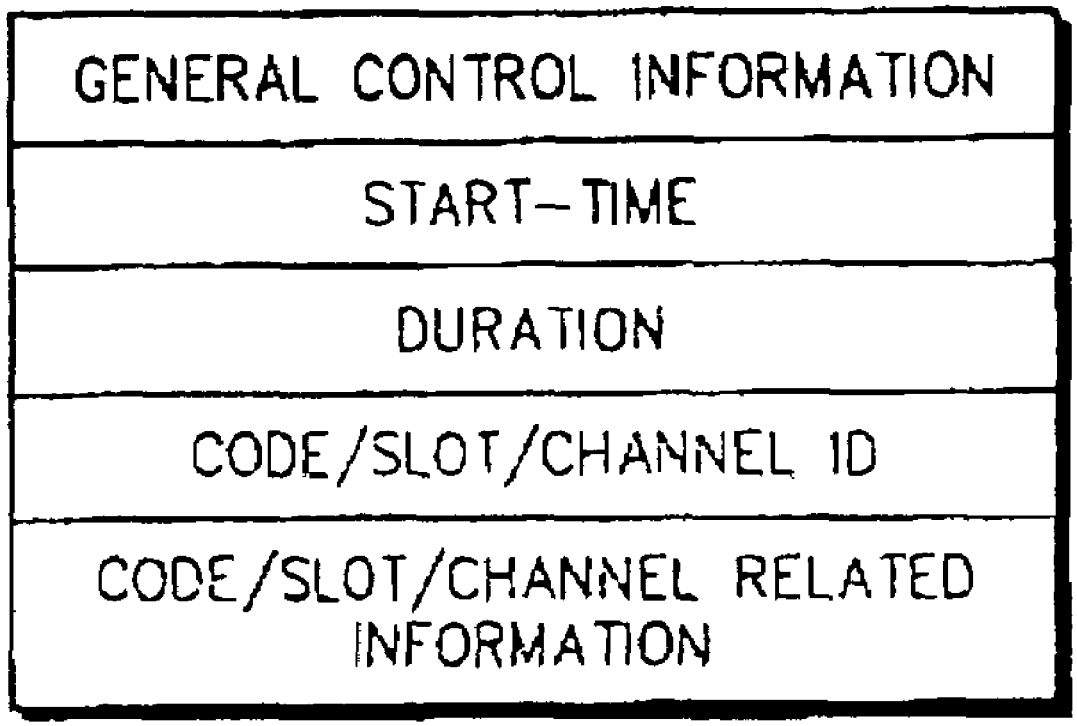
FIG. 5 illustrates the structure of a SCAM.

FIG. 5 illustrates the structure of a signal message used for assignment of a radio traffic channel. Referring to FIG. 5, the signal message includes general control information fields common to signal messages, a code/slot/channel identifier that identifies an assigned radio traffic channel, and code/slot/channel related information about the assigned radio traffic channel. In addition, the signal message has a start time at which traffic is to be transmitted/received on the radio traffic channel and a duration time for which traffic transmission/reception lasts on the radio traffic channel.

For cdma2000, the signal message can be an ESCAM (Extended SCAM), an FSCAMM (Forward Supplemental Channel Assignment Mini Message), or an RSCAMM (Reverse Supplemental Channel Assignment Mini Message).

The message structure shown in FIG. 5 may be simply used by modifying software in the MS. Or the message structure may be modified as shown in FIG. 6.

Figure 6:
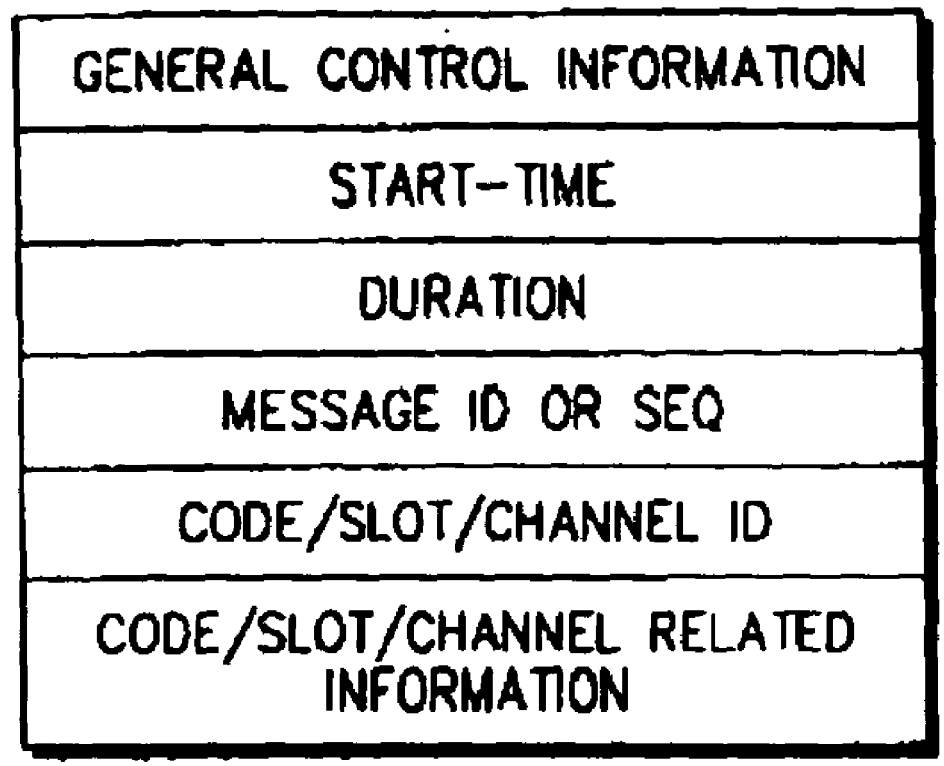
FIG. 6 illustrates the structure of an embodiment of a SCAM according to the present invention.

Referring to FIG. 6, a modified SCAM additionally includes a message identifier (MSG ID) or sequence number (SEQ). Added field is used to track the relationship between SCAMs. That is, the message ID/SEQ is used to identify the SCAM. Details will be described later referring to FIGS. 10 and 11.

From the foregoing, the present invention can be implemented by modifying message processing software in a BSS and an MS using a conventional call flow or message structure, or by adding one field to the conventional SCAM and modifying the software. It can be said that the present invention facilitates modification of a conventional system.

The MS can store a plurality of SCAMs and to do so, has a scheduling table (database) shown in FIG. 7 according to the present invention. The scheduling table lists start times, durations, message IDs or SEQs, and channel-related information of SCAMs.

Figure 1:
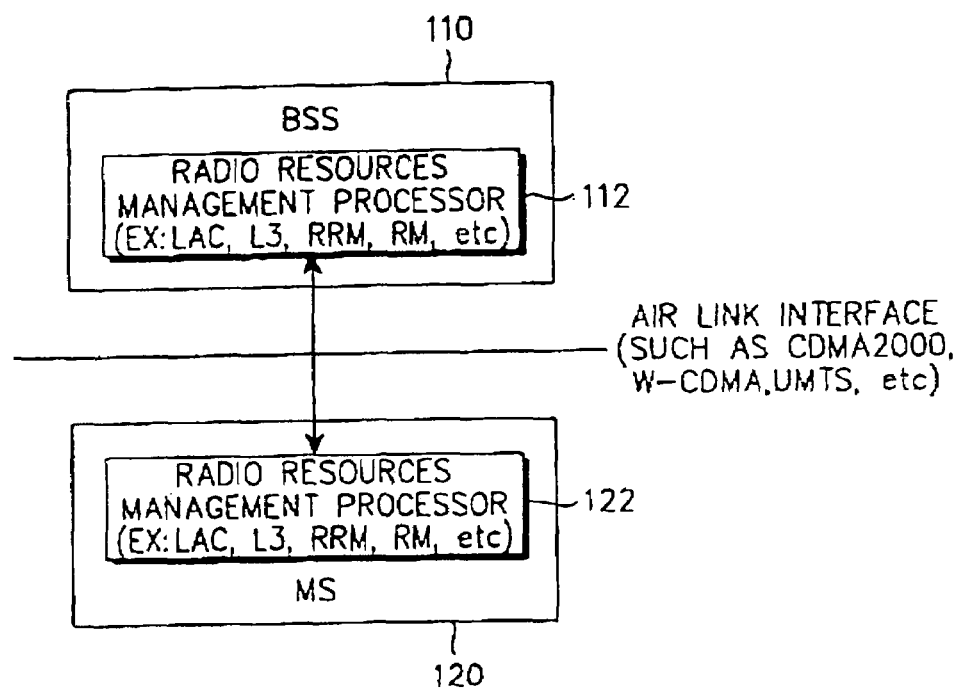
FIG. 1 illustrates the configuration of a typical radio data communication network including radio resources management processors.
Figure 2:
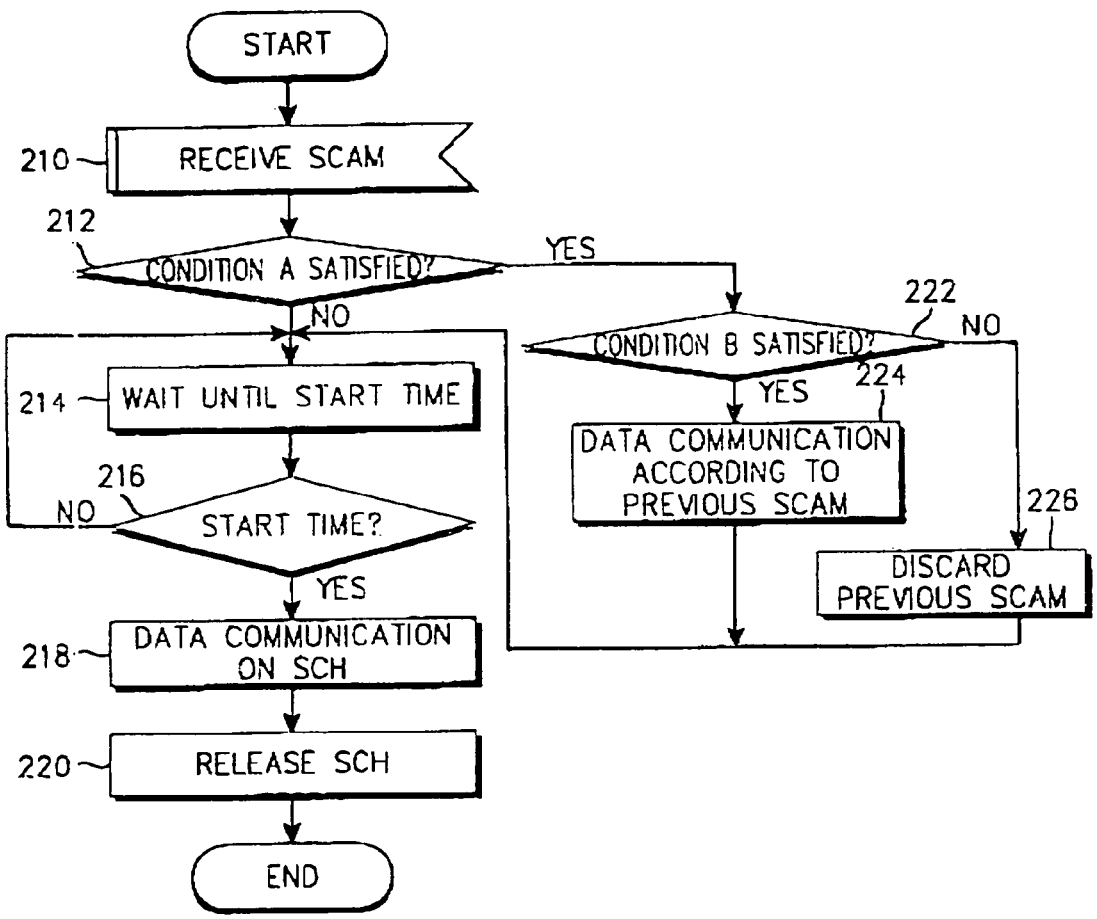
FIG. 2 is a flowchart illustrating a control operation for data communication on an SCH in a conventional CDMA MS.
Figure 3:
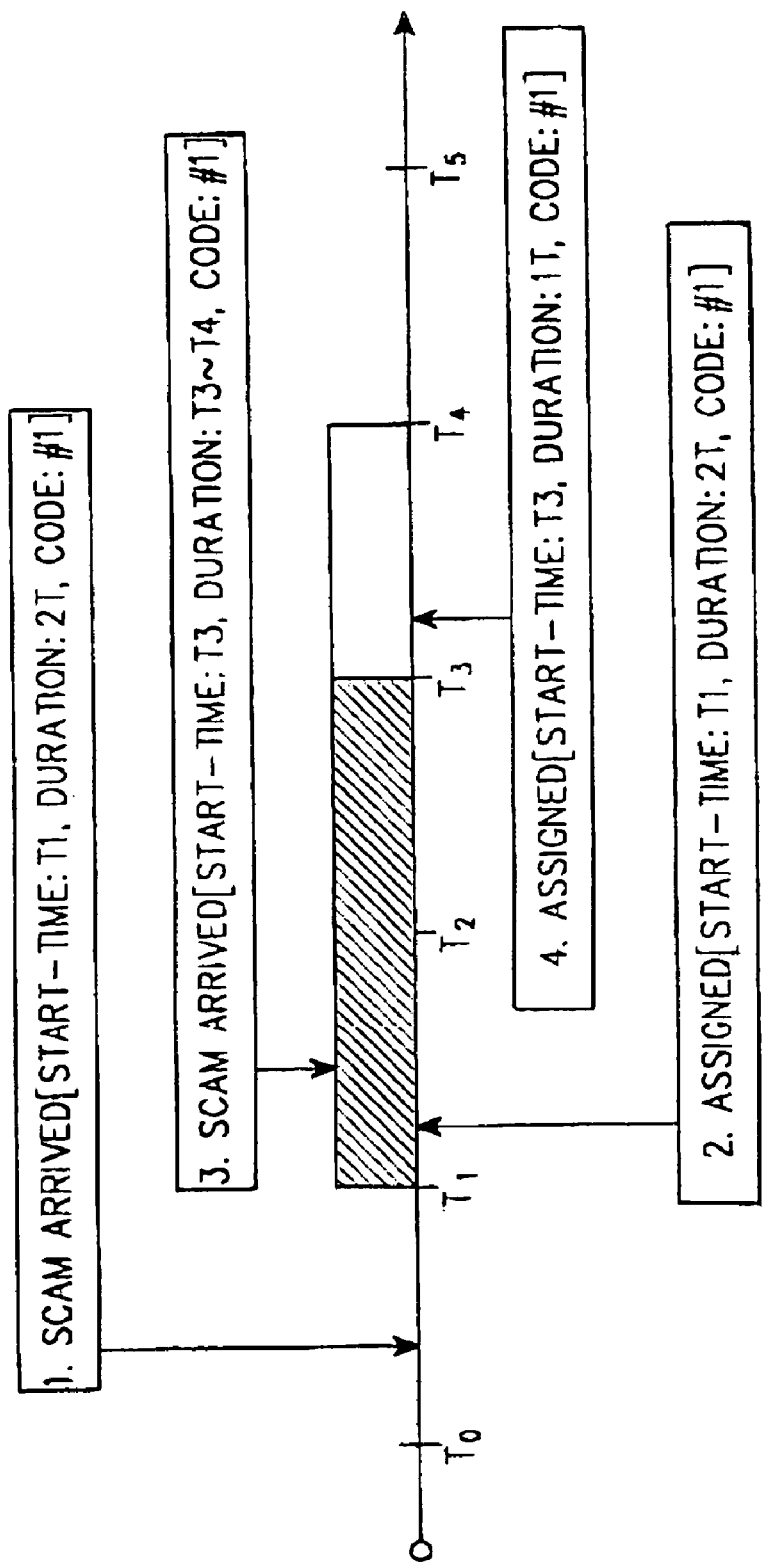
FIG. 3 illustrates an example of SCH assignment according to the arrival times of SCAMs in the conventional CDMA MS.
Figure 4:
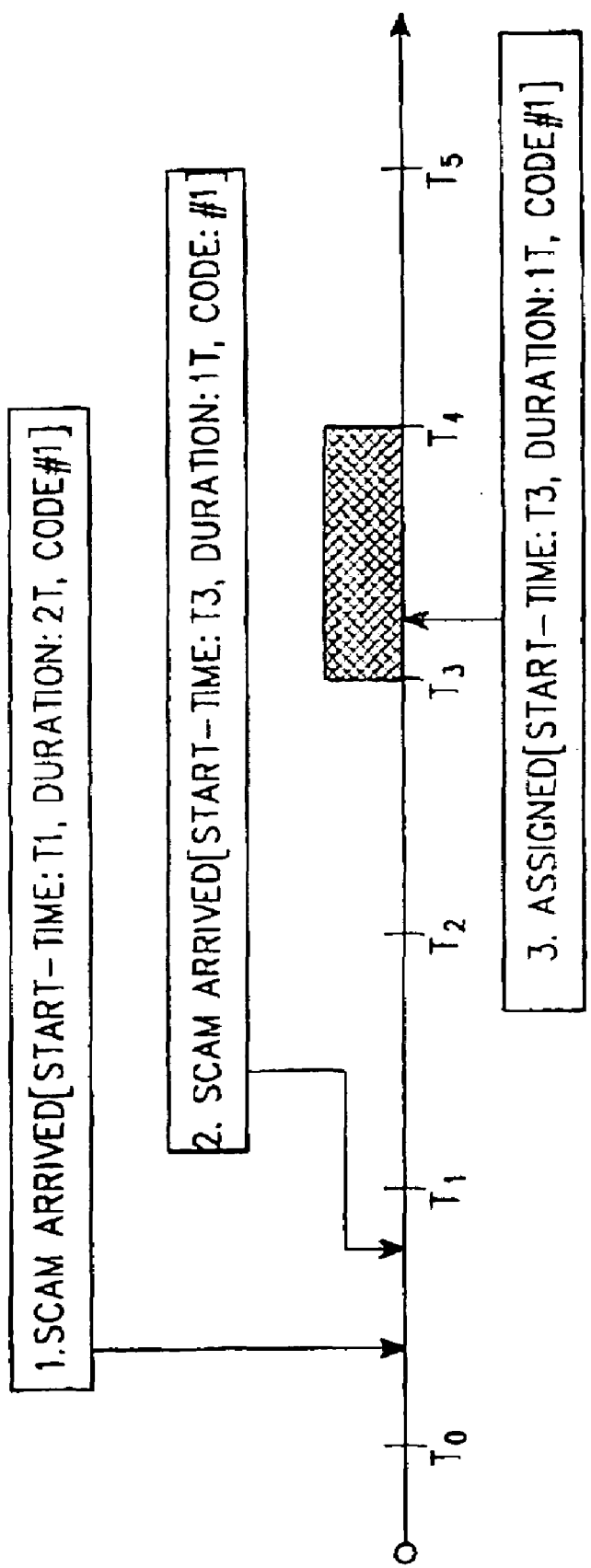
FIG. 4 illustrates another example of SCH assignment according to the arrival times of SCAMs in the conventional CDMA MS.
Figure 8:
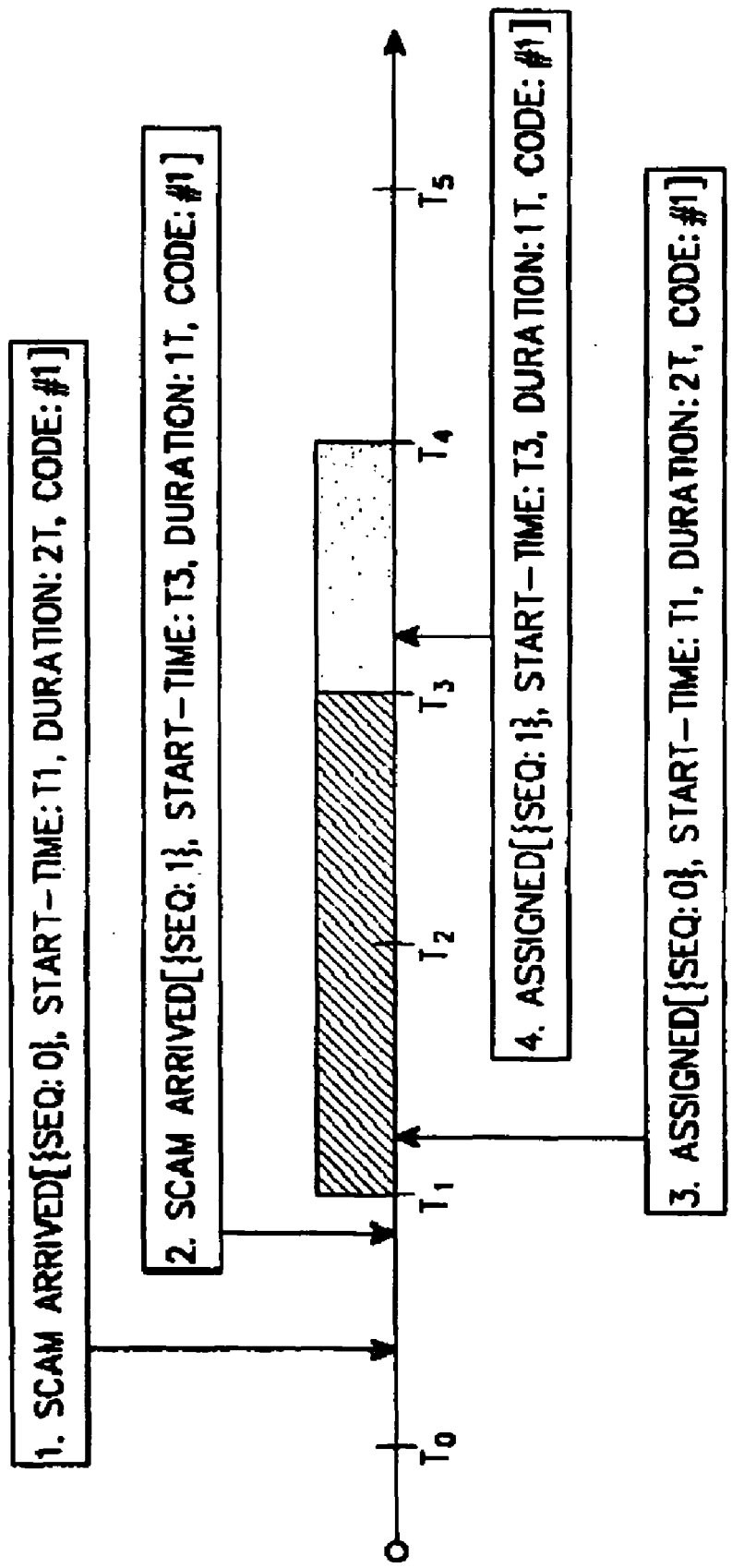
FIG. 8 illustrates an embodiment of an SCH assigning method based on the arrival times of SCAMs in the CDMA MS according to the present invention.

FIG. 8 illustrates an SCH assigning method that overcomes the problem encountered in the conventional SCH assigning method shown in FIG. 4.

Referring to FIG. 8, two SCAMs that arrive between time T0 and time T1 are discriminated as independent messages. This is possible because they have different start times or different message IDs or SEQs. The MS stores the two SCAMs and processes the earlier SCAM with a start time set to T1 at T1. Thus, the MS transmits/receives traffic for a T1-T3 period with code #1. At T3, the MS initiates traffic transmission/reception related to the later SCAM with code #1 and continues the traffic transmission/reception to a T3-T4 period.

Figure 9:
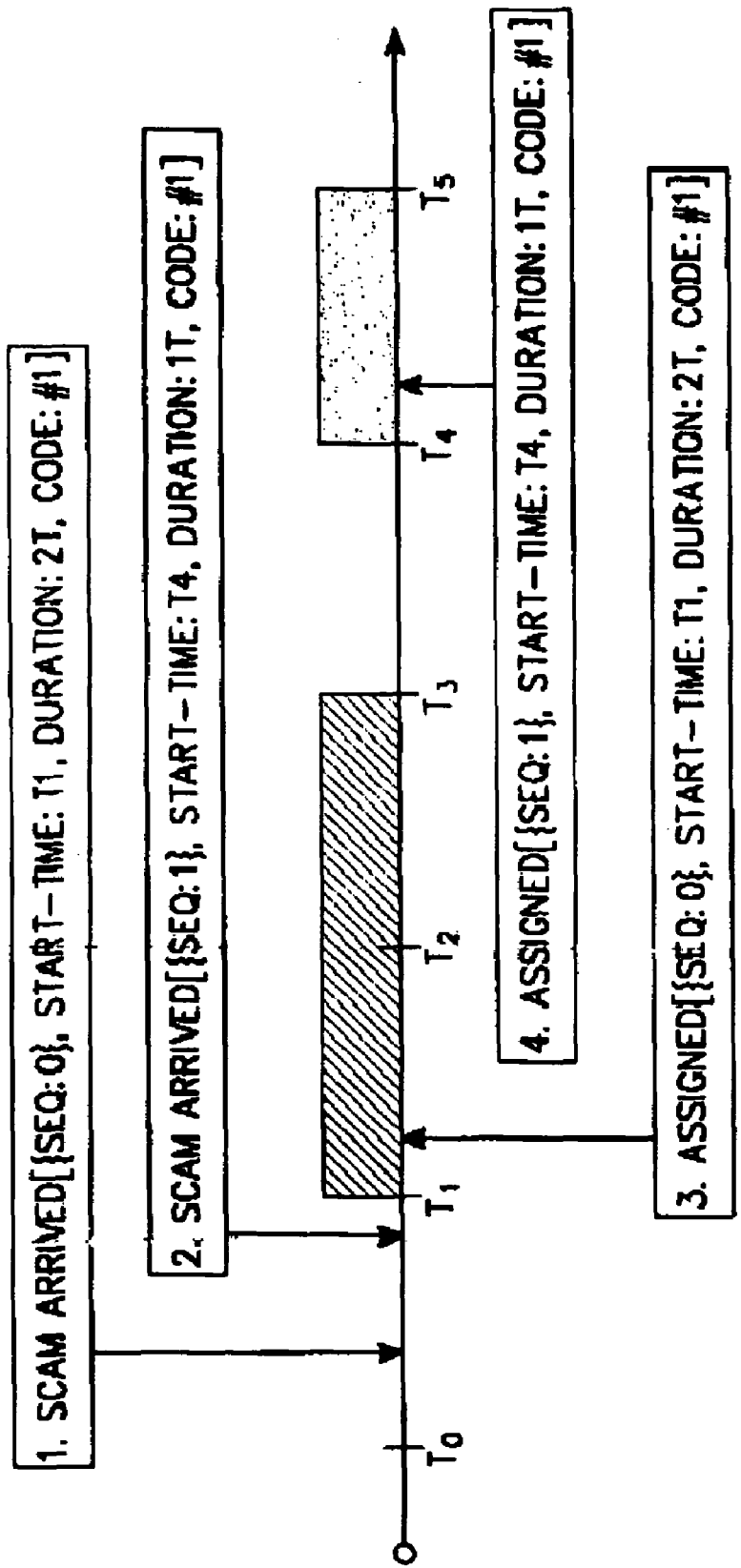
FIG. 9 illustrates another embodiment of the SCH assigning method based on the arrival times of SCAMs in the CDMA MS according to the present invention.

This independent feature of the received SCAMs enables SCH assignment shown in FIG. 9 in the present invention. Referring to FIG. 9, even in the case where transmission periods set in the SCAMs are not consecutive, the traffic transmission/reception is successfully done on assigned radio traffic channels for the T1-T3 period and for a T4-T5 period.

Figure 10:
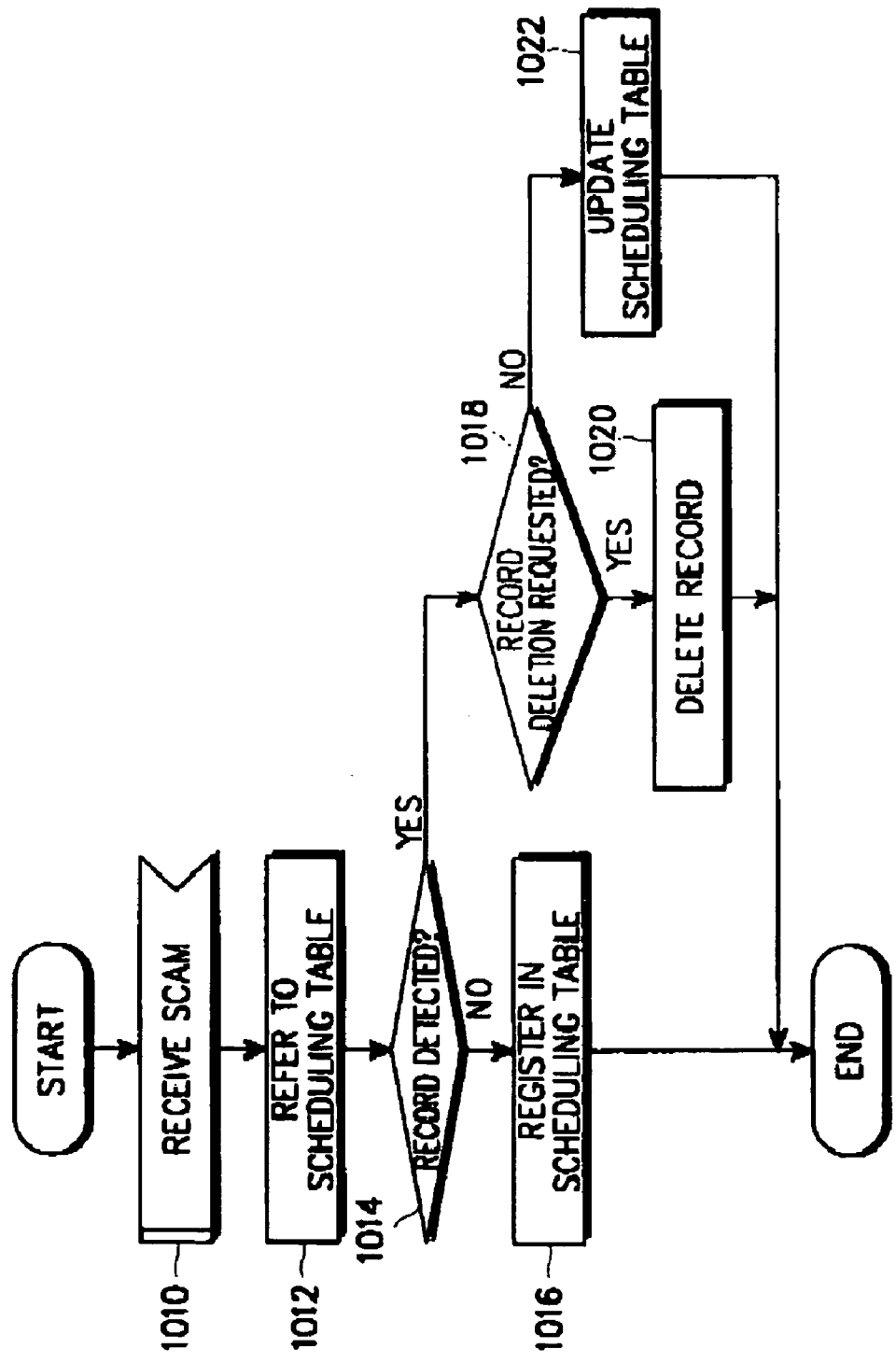
FIG. 10 is a flowchart illustrating a control operation for processing a SCAM in the CDMA MS according to an embodiment of the present invention.
Figure 11:
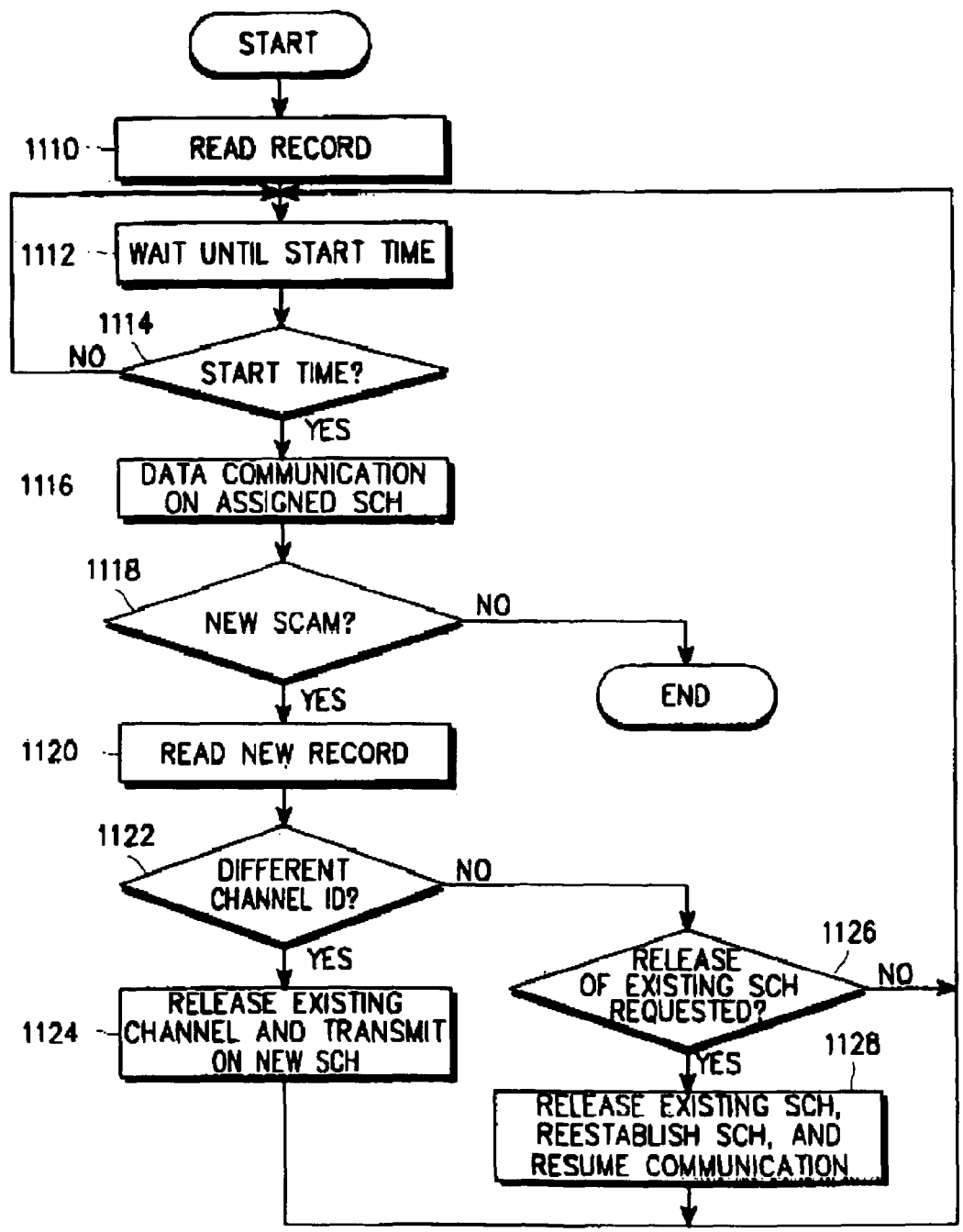
FIG. 11 is a flowchart illustrating a control operation for data communication on an assigned SCH in the CDMA MS according to the embodiment of the present invention.

FIG. 10 is a flowchart illustrating a control operation for processing SCAMs according to an embodiment of the present invention and FIG. 11 is a flowchart illustrating a control operation for transmitting/receiving messages on an SCH according to the embodiment of the present invention.

In the procedure shown in FIG. 10, the MS receives SCAMs from the BSS on an existing SCH, stores them sequentially, and makes a scheduling table with the stored SCAMs.

Referring to FIG. 10, the MS receives a SCAM on an existing SCH from the BSS in step 1010 and refers to a scheduling table for a record having the SEQ of the received SCAM, or for a record corresponding to a SCAM with a transmission period overlapping partially or wholly with that of the received SCAM in step 1012. Herein, it is noted that both SEQ and MSG ID can be used therefor and in the preferred embodiment of the present invention, the SEQ is used. A transmission period is defined as a period between the start time and the end of the duration time set in a SCAM, and for the transmission period, an MS conducts data communication on an SCH assigned by the SCAM. Here, information registered in the scheduling table in relation to received SCAMs will be referred to as records. If it is determined that the record does not exist in step 1014, which implies that the received SCAM has nothing to do with the previous SCAMs, the MS stores the received SCAM in the scheduling table in step 1016, and then the process ends.

On the other hand, if the record with the same message ID/SEQ or start time is detected in step 1014, the MS determines whether the received SCAM requests the record to be deleted in the scheduling table in step 1018. If the record deletion is requested, the MS removes the record from the scheduling table in step 1020, and the process ends.

If the deletion request is not confirmed in step 1018, the MS considers that the received SCAM requests the record to be updated and thus updates the record in step 1022. According to the contents of the received SCAM, the duration, start time, and channel ID of the record are updated, and then the process ends.

In summary, upon receipt of a SCAM that has been registered in the scheduling table, it is determined whether the registered record is to be deleted by checking the received SCAM in the present invention. If the deletion is confirmed, the registered record is deleted and otherwise, it is updated according to the SCAM. Upon receipt of a SCAM that is not registered in the scheduling table, it is registered in the scheduling table.

Now there will be given a description of a procedure of data communication on an assigned SCH between the BSS and the MS referring to the scheduling table with reference to FIG. 11.

According to the data communication procedure, SCAMs are sequentially read from the scheduling table and data communication is conducted on SCHs assigned by the read SCAMs.

Specifically, if the scheduling table is not empty, that is, if any record (SCAM) exists in the scheduling table, the MS reads the record from the scheduling table in step 1110 and determines whether it is a start time of the record in step 1112. The start time indicates a time at which data transmission is initiated on an assigned traffic channel. Here, the start time should be set to a unique value in each received SCAM. If the start time comes in step 1114, the MS establishes an SCH assigned by the read record and initiates a data communication with the BSS on the assigned SCH in step 1116. If not, the process returns to step 1112. The data communication is conducted on the channel with a code ID at a start time for a duration time according to the record.

In step 1118, the MS checks whether there is a new record registered in the scheduling table at the end of the traffic transmission/reception, that is, at the end of the duration time. If a new record is stored in the scheduling table in step 1118, the MS reads the new record in step 1120. If not, the process ends. A determination as to whether a new SCAM exists is made in a different manner depending on the conventional SCAM shown in FIG. 5 and the SCAM additionally having a message ID or SEQ shown in FIG. 6. In the former case, the existence or absence of a new SCAM is determined based on a start time which is different in each SCAM. In the latter case, the determination is made based on the message ID or SEQ of the SCAM. To implement the second method, the structure of a SCAM must be newly defined as shown in FIG. 6. In the embodiment of the present invention, it is determined whether a new SCAM is registered in the scheduling table by checking the message IDs or SEQs of SCAMs.

In step 1122, the MS compares a channel ID used in step 1116 with a channel ID of the new record. If the channel IDs are different, the MS releases the existing SCH and conducts data communication according to the start time, duration, and channel ID of the new record in step 1124.

If the channel IDs are identical at step 1122, the MS determines whether the existing SCH is to be released based on the start time of the new record in step 1126. The release of the existing SCH is determined according to whether the start time of the new record is apart from the end of the data communication conducted in step 1116 by a predetermined time, that is, whether the time between the end of the data communication and the start time is the predetermined time or above.

The determination is made to prevent the use efficiency of radio channels from decreasing due to unnecessary establishment of an SCH. The predetermined time must be set to an appropriate value in consideration of data communication by successive SCAMs. This falls into an issue associated with implementation of the embodiment of the present invention. If the predetermined time is too long, the existing SCH is maintained until data communication begins on an SCH assigned by the next SCAM, thereby decreasing the use efficiency of radio channels. On the other hand, if the predetermined time is too short, an unnecessary channel release and establishment is performed. Step 1126 is performed only when the SCH assigned by the previous SCAM is identical to that assigned by the new SCAM.

If the MS determines that the existing SCH must be released in step 1126, it releases the existing SCH in step 1128. The existing SCH is the SCH assigned for the data communication in step 1116. At the start time of the new record, the released SCH is reestablished and data communication resumes on the SCH. If the SCH is not to be released, the process returns to step 1112.

If the SCHs are identical and the existing SCH does not need to be released, the data communication on the existing SCH extends to the duration time of the new record. In this case, the two SCAMs may be merged into one SCAM according to the procedure of FIG. 10.

In the present invention, data communication is serviced sequentially according to SCAMs registered in the scheduling table. At the end of the data communication by a specific SCAM, the next SCAM is read. If an SCH assigned by the read SCAM is different from an existing SCH used for the data communication, the existing SCH is released and data communication is conducted on the new SCH. On the other hand, if the SCHs are identical, it is determined whether the existing SCH is to be released based on a start time set in the new SCAM. If the existing SCH is to be released, it is released and data communication is conducted on the SCH assigned by the new SCAM.

The above-described operations are implemented in an SCH assigning apparatus of the MS. The SCH assigning apparatus will be described below referring to FIG. 12.

Figure 12:
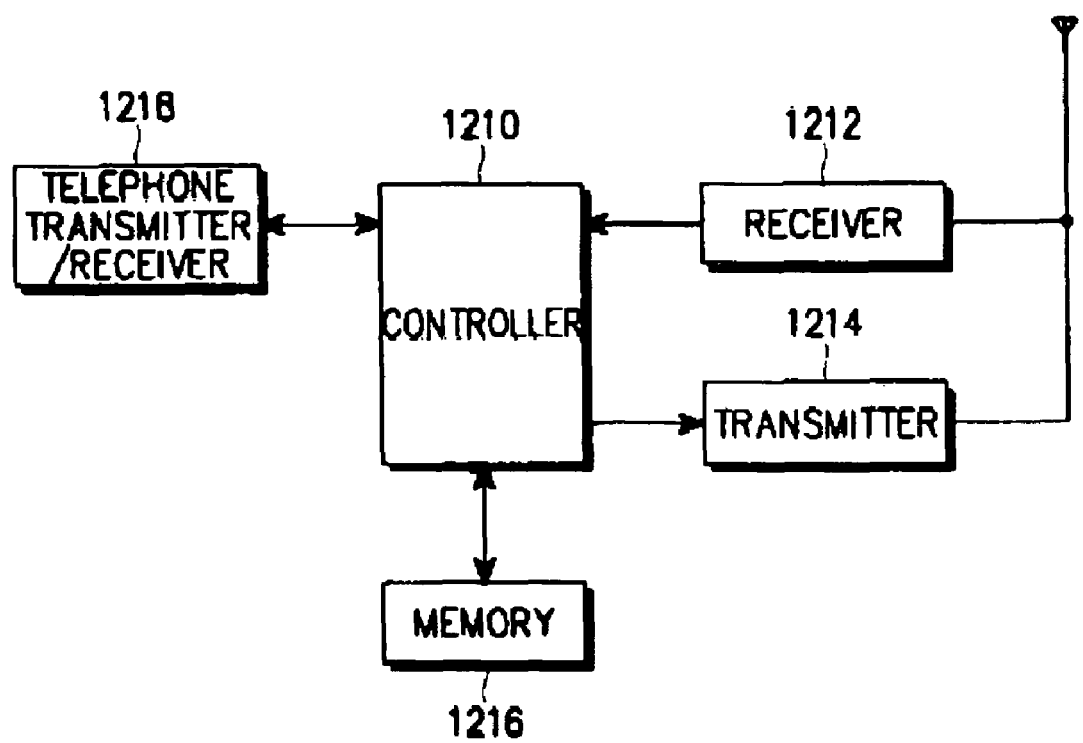
FIG. 12 is a block diagram of an SCH assigning apparatus in the CDMA MS according to the embodiment of the present invention.

In FIG. 12, a controller 1210 provides control to the operations according to the embodiment of the present invention. A receiver 1212 processes a radio signal including a SCAM received on a particular SCH from the BSS via an antenna ANT under the control of the controller 1210. The SCAM is a message requesting SCH assignment for data communication according to the present invention. A transmitter 1214 transmits a radio signal to the BSS via the antenna under the control of the controller 1210. Particularly, the transmitter 1214 establishes an SCH and exchanges data with the BSS on the established SCH under the control of the controller 1210. A memory 1216 stores information including a control program. To implement the present invention, the memory 1216 has a scheduling table, registers received SCAMs in the scheduling table, and manages the scheduling table under the control of the controller 1210. A telephone transmitter/receiver 1218 interfaces between users for a voice call under the control of the controller 1210.

In accordance with the present invention as described above, in the case where an MS receives a plurality of SCAMs, it stores them and conducts data communication according to the stored SCAMs. The management of radio resources assignment information in the MS and appropriate assignment of available radio channel transmission periods to the MS through BSS support of efficient scheduling and reservation of traffic channels increase the efficiency and utilization of radio traffic channels.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A channel assigning method in a mobile communication system, comprising the steps of:

generating a channel assignment message including a start time for channel assignment, a duration of the channel assignment, and a sequence number or a message identifier for identifying two or more channel assignment messages; and transmitting the channel assignment message to a mobile station on an existing traffic channel, without receiving a channel assignment request message from the mobile station wherein the sequence number or the message identifier is used for identifying a sequential order for each of a plurality of channel assignment messages.

2. The channel assigning method of claim 1, further comprising the step of deleting a previous channel assignment message.

3. The channel assigning method of claim 2, wherein if a previous channel assignment message is deleted, the start time and sequence number of the channel assignment message are set according to a start time and a sequence number of the previous channel assignment message and the duration of the channel assignment message is set to 0.

4. The channel assignment method of claim 1, further comprising the step of updating a previous channel assignment message.

5. The channel assigning method of claim 4, wherein if a previous channel assignment message is updated, the start time, sequence number, and duration of the channel assignment message are set according to a start time, sequence number, and duration of the previous channel assignment message.

6. The channel assigning method of claim 3, wherein if the previous channel assignment message is deleted, the sequence number of the channel assignment message is set to be identical to the sequence number of the previous channel assignment message.

7. The channel assigning method of claim 5, wherein if the previous channel assignment message is updated, the sequence number of the channel assignment message is set to be identical to the sequence number of the previous channel assignment message, or a transmission period between the start time and the end of the duration of the channel assignment message overlaps with a transmission period between the start time and the end of the duration of the previous channel assignment message for a predetermined time period.

8. The channel assigning method of claim 1, wherein the channel assignment message is a supplemental channel assignment message.

9. A scheduling table making method comprising the steps of:

receiving a plurality of channel assignment messages successively from a base station on an existing traffic channel, without the base station receiving a channel assignment request message, each of the channel assignment messages having the fields of a start time, a duration, a sequence number or a message identifier for identifying two or more messages, and a channel identifier for identifying channel identification; and storing the received channel assignment messages in a memory according to the start times, durations, and sequence numbers of the channel assignment messages, so that data communication is conducted on channels assigned by the channel assignment messages.

10. The scheduling table making method of claim 9, further comprising the step of deleting a channel assignment message from the memory if it is determined based on the start time, duration, and sequence number of the channel assignment message that the channel assignment message was stored in the memory and requests the stored channel assignment message to be deleted.

11. The scheduling table making method of claim 9, further comprising the step of updating a channel assignment message in the memory if it is determined based on the start time, duration, and sequence number of the channel assignment message that the channel assignment message was stored in the memory and requests the stored channel assignment message to be updated.

12. The scheduling table making method of claim 10, wherein if a channel assignment message having a sequence number identical to the sequence number of a received channel assignment message is in the memory, it is determined that the received channel assignment message was stored in the memory.

13. The scheduling table making method of claim 12, wherein if the duration of the received channel assignment message is 0, it is determined that the received channel assignment message requests the stored channel assignment message to be deleted.

14. The scheduling table making method of claim 11, wherein if the memory has a channel assignment message having a sequence number identical to the sequence number of a received channel assignment message or if the memory has a channel assignment message having a transmission period between a start time and the end of a duration that is overlapped with a transmission period between the start time and the end of the duration of a received channel assignment message, it is determined that the received channel assignment message was stored in the memory.

15. The scheduling table making method of claim 14, wherein if the duration of the received channel assignment message is not 0, it is determined that the received channel assignment message requests the stored channel assignment message to be updated.

16. The scheduling table making method of claim 10, wherein the channel assignment messages are supplemental channel assignment messages.

17. A channel assigning method for a mobile station in a CDMA mobile communication system, comprising the steps of:
  receiving a plurality of channel assignment messages successively from a base station on an existing traffic channel, without the base station receiving a channel assignment request message, each of the channel assignment messages having the fields of a start time, a duration, a sequence number or a message identifier for identifying two or more messages, and a channel identifier for channel identification;
  storing the received channel assignment messages in a memory according to the durations and sequence numbers or the message identifier of the channel assignment messages; and
  conducting data communication on a channel corresponding to the channel identifier of a first read channel assignment message for a period between the start time and the end of the duration set in the read channel assignment message and then on a channel corresponding to the channel identifier of a next read channel assignment message for a period between the start time and the end of the duration set in the next channel assignment message, the start time of the next channel assignment message being set to or after the end of the data communication according to the first read channel assignment message.

18. The channel assigning method of claim 17, further comprising the step of deleting a channel assignment message from the memory if it is determined based on the start time, duration, and sequence number of the channel assignment message that the channel assignment message was stored in the memory and requests the stored channel assignment message to be deleted.

19. The channel assigning method of claim 17, further comprising the step of updating a channel assignment message in the memory if it is determined based on the start time, duration, and sequence number of the channel assignment message that the channel assignment message was stored in the memory and requests the stored channel assignment message to be updated.

20. The channel assigning method of claim 18, wherein if a channel assignment message having a sequence number identical to the sequence number of a received channel assignment message is in the memory, it is determined that the received channel assignment message was stored in the memory.

21. The channel assigning method of claim 20, wherein if the duration of the received channel assignment message is 0, it is determined that the received channel assignment message requests the stored channel assignment message to be deleted.

22. The channel assigning method of claim 19, wherein if the memory has a channel assignment message having a sequence number identical to the sequence number of a received channel assignment message or if the memory has a channel assignment message having a transmission period between a start time and the end of a duration that is overlapped with a transmission period between the start time and the end of the duration of a received channel assignment message, it is determined that the received channel assignment message was stored in the memory.

23. The channel assigning method of claim 22, wherein if the duration of the received channel assignment message is not 0, it is determined that the received channel assignment message requests the stored channel assignment message to be updated.

24. The channel assigning method of claim 17, wherein the data communication step comprises the steps of:
  reading a channel assignment message with the earliest start time and conducting data communication on a channel corresponding to the channel identifier of the read channel assignment message for a period between the start time and the end of the duration set in the read channel assignment message;
  reading a channel assignment message with the start time second to the earliest and conducting data communication on the existing channel for a period between the start time and the end of the duration set in the second read channel assignment message if the channel identifiers of the first and second read channel assignment messages are identical;
  releasing the existing channel at the end of the duration set in the first read channel assignment message if the channel identifiers of the first and second read channel assignment messages are different, and conducting data communication on a channel corresponding to the channel identifier of the second read channel assignment message for a period between the start time and the end of the duration set in the second read channel assignment message.

25. The channel assigning method of claim 24, wherein if the channel identifiers of the first and second read channel assignment messages are identical and the time from the end of the data communication according to the first read channel assignment message and the start time until the start time of the second read channel assignment message is a predetermined time or greater, the existing channel is released, the released channel is reestablished from the start time and the end of the duration of the second read channel assignment message, and conducting data communication on the reestablished channel.

26. The channel assigning method of claim 17, wherein the channel assignment messages are supplemental channel assignment messages.

27. A channel assigning apparatus for a mobile station in a CDMA mobile communication system, comprising:
   a receiver for receiving a plurality of channel assignment messages successively from a base station on an existing traffic channel, without the base station receiving a channel assignment request message, each of the channel assignment messages having the fields of a start time, a duration, a sequence number or a message identifier for identifying two or more messages, and a channel identifier for channel identification;
   a memory having a scheduling table for storing the received channel assignment messages; and
   a controller for storing the received channel assignment message in the scheduling table of the memory according to the durations and sequence numbers or the message identifier of the channel assignment messages, sequentially reading the stored channel assignment messages, and assigning channels based on the channel identifiers of the read channel assignment messages, for data communication.

28. The channel assigning apparatus of claim 27, wherein the controller deletes a channel assignment message in the scheduling table if the controller determines based on the start time, duration, and sequence number of the channel assignment message that the channel assignment message was stored in the scheduling table and requests the stored channel assignment message to be deleted.

29. The channel assigning apparatus of claim 27, wherein the controller updates a channel assignment message in the scheduling table if it is determined based on the start time, duration, and sequence number of the channel assignment message that the channel assignment message was stored in the scheduling table and requests the stored channel assignment message to be updated.

30. The channel assigning apparatus of claim 28, wherein if a channel assignment message having a sequence number identical to the sequence number of a received channel assignment message is in the scheduling table, the controller determines that the received channel assignment message was stored in the scheduling table.

31. The channel assigning apparatus of claim 30, wherein if the duration of the received channel assignment message is 0, the controller determines that the received channel assignment message requests the stored channel assignment message to be deleted.

32. The channel assigning apparatus of claim 29, wherein if the scheduling table has a channel assignment message having a sequence number identical to the sequence number of a received channel assignment message or if the scheduling table has a channel assignment message having a transmission period between a start time and the end of a duration that is overlapped with a transmission period between the start time and the end of the duration of a received channel assignment message, the controller determines that the received channel assignment message was stored in the scheduling table.

33. The channel assigning apparatus of claim 32, wherein if the duration of the received channel assignment message is not 0, the controller determines that the received channel assignment message requests the stored channel assignment message to be updated.

34. The channel assigning apparatus of claim 27, wherein the controller conducts data communication on a channel corresponding to the channel identifier of a first read channel assignment message for a period between the start time and the end of the duration set in the read channel assignment message and then on a channel corresponding to the channel identifier of a next read channel assignment message for a period between the start time and the end of the duration set in the next channel assignment message, the start time of the next channel assignment message being set to or after the end of the data communication according to the first read channel assignment message.

35. The channel assigning apparatus of claim 27, wherein the channel assignment messages are supplemental channel assignment messages.

* * * * *